E. P. COWLES.
MOTOR VEHICLE.
APPLICATION FILED SEPT. 6, 1901.
1,050,810.
Patented Jan. 21, 1913.
4 SHEETS—SHEET 1.
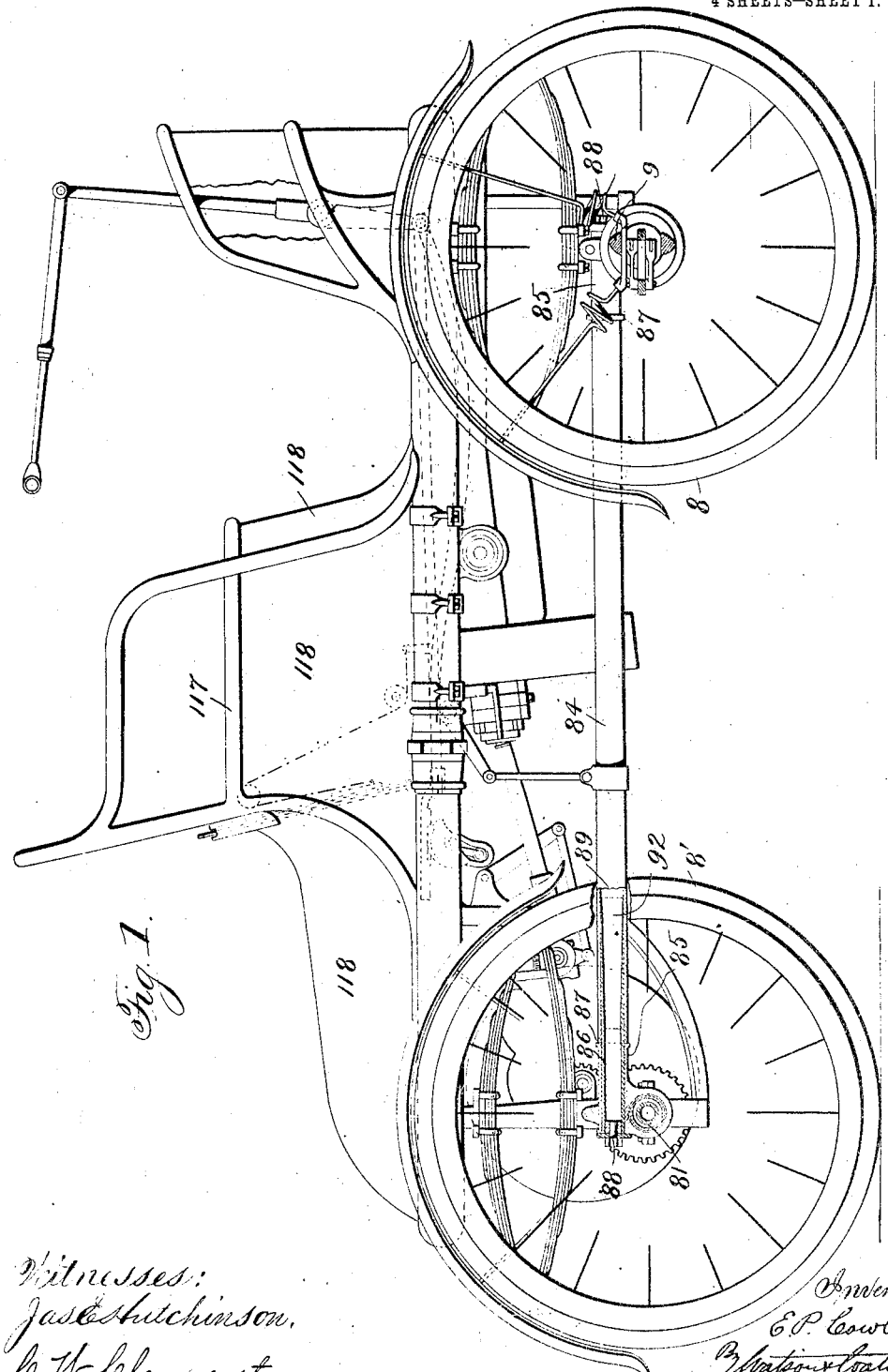

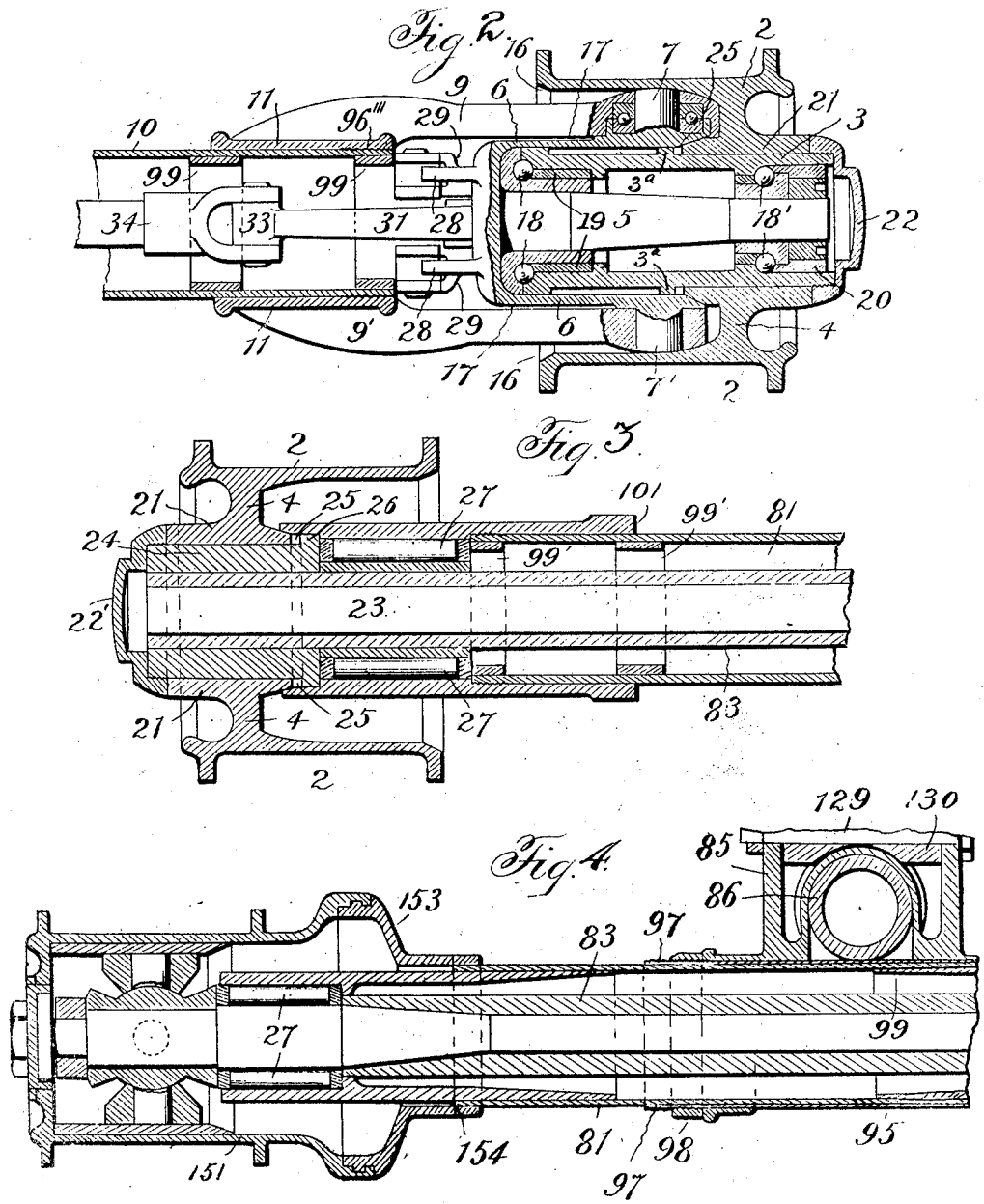

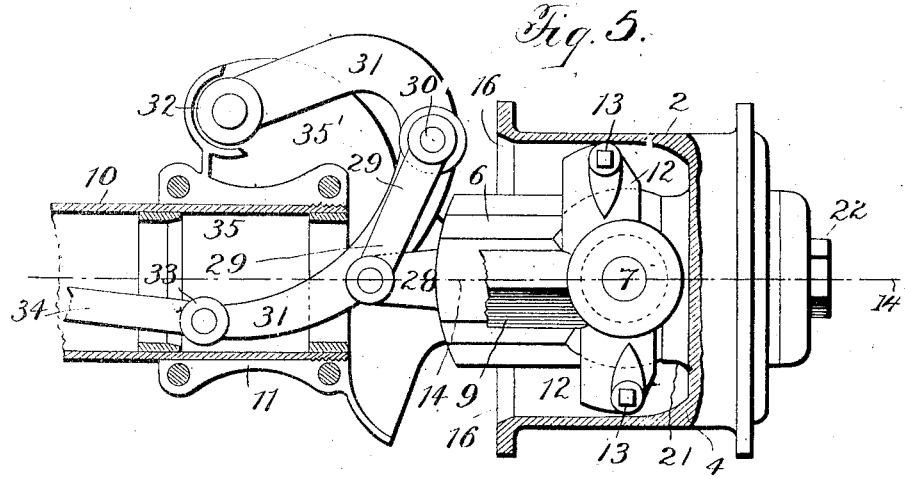
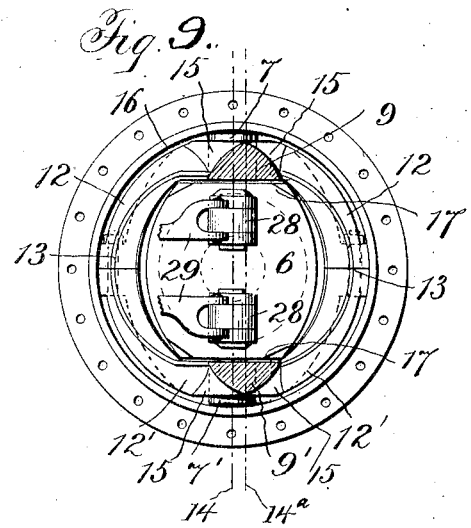

E. P. COWLES.
MOTOR VEHICLE.
APPLICATION FILED SEPT. 6, 1901.
1,050,810.
Patented Jan. 21, 1913.
4 SHEETS—SHEET 4.
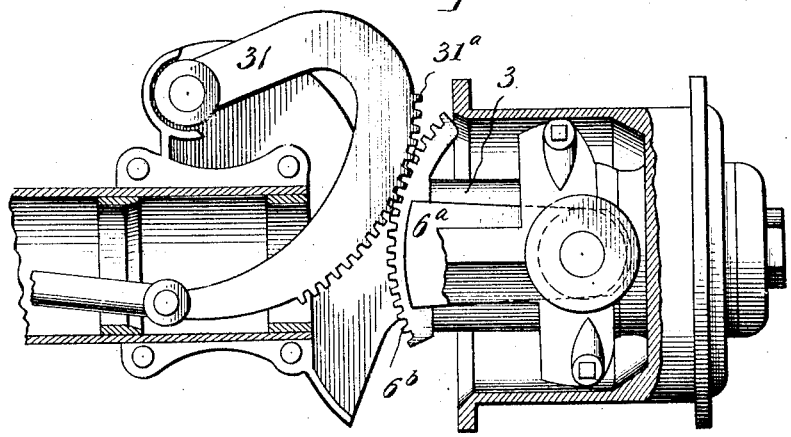
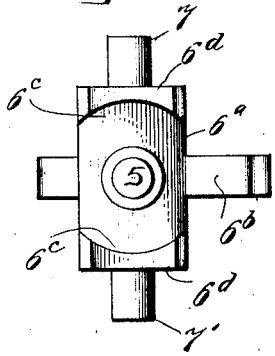
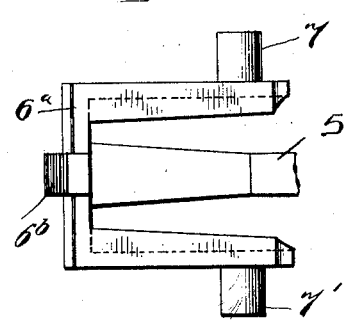
Witnesses
Inventor
E. P. Cowles
By Watson & Watson
Attorneys

UNITED STATES PATENT OFFICE.

EDWARD P. COWLES, OF WARREN, OHIO, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,050,810.

Specification of Letters Patent. Patented Jan. 21, 1913.

Application filed September 6, 1901. Serial No. 74,497.

*To all whom it may concern:*

Be it known that I, EDWARD P. COWLES, a citizen of the United States, residing at Warren, in the county of Trumbull, State of Ohio, have invented certain new and useful Improvements in Motor-Vehicles, of which the following is a specification.

The present invention relates to improvements in motor vehicles and particularly to an improved steering wheel hub and means for mounting the same.

In the accompanying drawings, Figure 1 is a side elevation of a motor vehicle provided with wheel hubs constructed in accordance with the present invention; Fig. 2 is a vertical section through a steering wheel hub constructed in accordance with this invention and a portion of the axle; Fig. 3 is a similar view through a driving hub; Fig. 4 is a similar view through a hub adapted for both steering and driving; Fig. 5 is a view showing the hub illustrated in Fig. 2, partly in section, a portion of the shaft in section and the connecting mechanism in plan; Figs. 6, 7, and 8, are views showing a similar hub having a differently formed and connected trunnion fork and axle; Fig. 9 is an inner end view of the hub shown in Fig. 5.

In Fig. 1 of the drawing there is illustrated a motor vehicle comprising a suitable body 118 which is supported on a frame having front steering wheels 8 and rear driving wheels 8'. The running gear or supporting frame of the vehicle illustrated, comprises a forward or front tubular axle 10, a rear axle 81 made hollow and through which the driving shafts for the rear wheels extend, said axles being connected by tubular reach bars 84. The connections between the reach bars and axle are shown as formed by long bearing T-shaped couplings 85 in which the reach bars and axles are free to turn. Preferably I arrange the member of each of the T-couplings through which the reach bars pass above the member through which the axle passes, as shown. That part 86 (section Figs. 1 and 4) of the reach bars which passes through the couplings 85 is reduced somewhat leaving a shoulder 87 which bears against the end of the coupling. On the end of the reach bar is a nut and washer 88 which bears against the opposite end of the coupling.

Fig. 2 illustrates driving and steering mechanism for a motor vehicle but as such features are not included in the claims, a specific description thereof is not considered necessary. The patentable features illustrated and not herein claimed are reserved for other applications. The steering wheels illustrated in the drawings are of that form or type in which the main axle or wheel support is fixed and the wheel is adapted to turn, to guide the vehicle, on joints or "steering knuckles" arranged at or near the central revolving plane of the wheel.

Referring particularly to Figs. 2, 5, and 9, it will be seen that each steering hub is composed of two hollow cylinders 2, 3, placed concentrically one within the other and joined by a web or spider 4, which is locked to the cylinder 3. The inner cylinder 3 is what may be termed the bearing member, corresponding to the "box" or "sleeve" in hubs of ordinary construction. The outside cylinder 2 receives the wheel spokes which can be of wire, as shown, or of any other suitable material. 5 designates the axle journal or trunnion, the base 6 of which in these views is formed in the cup shape shown, extending entirely around the axle and into the hub between the two cylinders 2, 3. At its free end this cup shaped member of the axle is provided with two short trunnions 7, 7', arranged diametrically opposite each other. The said trunnions 7, 7', are arranged in the same vertical planes, their axes being in the central plane of rotation of the wheel. Said trunnions extend into and have bearings in eyes formed in the upper and lower arms or branches 9, 9', of a fork which is attached to the end of the stationary or fixed axle 10 by a divided socket 11. It is obvious that by this construction the wheel while being held rigidly upright is free to turn laterally on a vertical axis which lies in the central plane of rotation of the wheel and that the tendency of the wheel to be deflected from its proper course by contact with obstructions is reduced to a minimum.

To give the fork 9, 9', the necessary strength without making it undesirably heavy the upper and lower members thereof are provided at their free ends with arms 12, 12', respectively. These arms, two from each fork member, extend about the cup-shaped portion 6, of the axle and are bolted together at 13 where they meet in the central horizontal plane of the axle. By this means both members of the fork are caused to equally sustain the weight on the axle and by making the arms 12, 12', integral with the fork they form in connection with the socket 11 a rigid parallelogram and the truss principle is made available to multiply their united strength. By this arrangement the fork can be made very light and have abundance of strength.

It will be observed that the steering wheels, when outside of the curve they are turning, swing laterally much less than when inside, by reason of the necessity of their revolving planes being always tangential to concentric circles. By placing the fork arms 9, 9', a little forward of the rotating axis of the wheel, shown by dotted lines 14 in Fig. 9, the line 14$^a$ indicating the central plane of the fork, and by making their outside surfaces 15 conform to the inner face of the outside cylinder 2 of the hub when turned laterally to their extreme limit, I am able to get the largest section of arms 9, 9', with a minimum diameter of hub and also to make said arms of the triangular section shown in Fig. 9, which is well adapted to resist lateral strains on said arms.

By cupping the base 6 of axle journal as shown and making the axle trunnion 5, cup 6, and trunnions 7, 7', of one piece, the sides of cup 6 are made available to sustain and stiffen the trunnions 7, 7', and I am able to flatten the upper and lower side of cup 6, as at 17, and bring the fork arms 9, 9', relatively near together. By making the fork in two parts, the ends of arms 9, 9', can be placed over the fixed trunnions and the eyes at the ends of arms 9, 9', can be made solid. This connection with a one-piece axle trunnion, described above, makes it possible to construct a strong steering knuckle inside of the wheel hub with a sufficiently long pivot to give the wheel stability and to make the steering knuckle very compact and light, without materially increasing the diameter of the hub over that ordinarily employed.

The steering hub hereinbefore described is adapted to any kind of bearing. Preferably I use a combined ball and plain bearing, the ball bearings 18, 18', of which are of the usual form. The bearing cylinder 3 of the hub has a bronze ring or sleeve 19 fitted therein near its inner end, which sleeve bears against the surface of the axle 5, or the ball race-sleeve which surrounds the axle. About the ball race and jam nut of the ball bearing 18' is fitted another bronze ring 20 which contacts with the inner surface of the outer end of the bearing cylinder 3. These plain bearings ordinarily are inoperative but under great strains they assist the ball bearings, and when either or both ball bearings are disabled the plain bearings will do all the work.

The rear wheels of an automobile by reason of their function of both driving and carrying the most weight are much more subject to wear and liable to be disabled than the front wheels, and it often happens that a rear wheel tire which has become so much worn that it would soon be useless on a driving wheel would last indefinitely on a front or steering wheel. It is a great advantage therefore to have steering and driving wheels interchangeable. I accomplish this desirable end by forming on the web 4 which connects the two hub cylinders 2, 3, a boss 21 that is bored out so as to fit closely over the outer end of the bearing cylinder 3. This boss is provided with an inwardly projecting flange the inner face of which is provided with teeth or projections that interlock with projections 3$^a$, on the cylinder 3. A cap nut 22, threaded on the outer end of the cylinder forces and retains the boss 21 firmly in place. The rear driving axle 23, Fig. 3, may as shown, have its outer end enlarged by a spool 24, the outside diameter of which is accurately the same as the diameter of the outer end of cylinder 3 of the steering wheel hub so that the boss 21 of any wheel will fit either the cylinder 3 or the spool 24. The rotating motion of driving axle 23 can be transmitted to the boss 21 by a feather or key, or any other suitable means, but I prefer to provide the inner end of the spool 24, adjacent the roller bearings 27, with a flange or shoulder 26, which is provided on its outer face with a series of teeth or projections adapted to engage with teeth or projections 25, on the boss 21 of the hub; and which are engaged by the teeth 3$^a$ when the hub is applied to a steering axle. A cap nut 22', similar to 22 holds the teeth on the boss 24 in engagement with those on shoulder 26. By simply removing nuts 22, 22', the wheels can be interchanged, or in case of extended journeys an extra wheel carried on the carriage can be quickly and conveniently put on to replace a disabled one, without disturbing the ball or roller bearings in any way. Another important advantage gained by this improved hub is: The roller bearing 27 of the driving axle can be extended inside the hub of the driving wheel well toward the center, relieving driving axle 23 of much strain in carrying the weight of the vehicle.

One essential feature of an efficient motor vehicle steering mechanism is that there shall be no lost motion between the parts thereof and that the slightest movement of the steering lever shall produce a corresponding movement of the steering wheels. For this reason it is necessary that the fulcrums of the various levers have rigid metal connections and that the joints be kept free from dust to avoid wear. To gain this end I place practically all of the steering mechanism inside the front axle 10 which is a single tube of large diameter. This also has the effect of giving the front axle a more symmetrical appearance as the rods, levers, etc., usually exposed are concealed.

As shown in Figs. 2, 5 and 9, two lugs or projections 28 on the base 6 of the axle trunnion 5 are connected by links 29 to a curved lever 31, said links and lever being pivotally connected at 30. The lever 31 (see Fig. 5) is pivoted at one end, as at 32, to the socket 11, the other end of said lever being pivoted at 33 to a rod 34 which is connected to the operating mechanism not shown and which may be of any suitable character. Lever 31 which is practically a right angled lever is made of the form shown and passes between links 29 and lugs 28 in order to bring the wheel as near as possible to the end of the fixed axle 10 and reduce the strain on socket joint 11. The action of curved lever 31 and base 6 of axle trunnion is practically the same as two gears intermeshing, links 29 taking the place of gear teeth, and in Fig. 6, this toothed arrangement is shown. Referring to said figure, and also to Figs. 7 and 8, it will be noted that the outer edge of the curved lever 31 is provided with teeth 31ª and the end of the base 6ª is provided with a segmental rack 6ᵇ meshing with the teeth upon the lever. In said figures, is shown a modified form of trunnion base 6ª, which instead of being cup-shaped and surrounding the axle sleeve, is forked, as clearly shown in Figs. 7 and 8. The inner side 6ᶜ of each fork arm is curved to conform to the curvature of the axle sleeve, while the outer sides 6ᵈ are flat and parallel, thus giving them practically a "channel iron" cross section. By giving the fork arms a channel iron section, and making them integral with the axle, base and trunnions, it is possible to obtain sufficient strength and stiffness within a small space and leave the entire space between the hub cylinders, at the sides, through which the arms 12, 12′ extend, clear. By this arrangement it is possible to provide a strong and durable center steering hub of compact size which will not be undesirably heavy. Many forms of hubs of this character have been heretofore proposed, but have, after practical tests, been found unsatisfactory because they were easily broken or disarranged and if heavy enough to have the desired strength were large and clumsy. According to the present invention, however, all of these objections are overcome.

The axles shown are formed of tubes which may be reinforced by rings 99. In addition to being clamped to the front axle in the manner described, the fork of the steering wheels may be engaged with said axle by a thread 96‴.

The rear axle may be reinforced by a split tube 95 having a threaded section 97 which is surrounded by a clamp nut 98 and the roller race 101 is threaded on said axle as shown, reinforcing rings 99′ being also arranged within the axle adjacent said race. The driving shaft 23, or 83, extends through the rear axle, as shown in Figs. 3 and 4. The latter figure illustrates a slightly different form of hub and connection between the hub and axle than that shown in the other figures. In this form of hub the driving axle 83 is connected with the interior of a hollow hub body 151 by a universal joint arranged in the central plane of the revolution of the wheel and permitting the latter, while receiving the rotating power of the driving axle, to oscillate freely in either direction. The inner end of the tubular body 151 of the hub engages a sway block 153 having a horizontal slot 154 sliding on the axle. This holds the wheel rigidly upright, while allowing it to oscillate to conform to the direction of the motion of the vehicle.

Having described my invention what I claim and desire to secure by Letters-Patent is, 1. In a motor vehicle, the combination with a stationary axle, of a wheel hub consisting of two connected and concentrically arranged members, a horizontal trunnion extending through the inner of said tubular hub members, bearings arranged between said horizontal trunnion and inner hub member, two vertical trunnions formed integral with the horizontal trunnion and supported from the axle between said tubular hub members, and means for adjusting the hub about the axis of said vertical trunnions.

2. In a motor vehicle, the combination with an axle, of a wheel hub consisting of two concentrically arranged members, a forked trunnion support provided with an integral horizontal trunnion extending into the inner hub member and with arms extending into the space between said hub members, above and below the inner hub member, and having their inner faces grooved or channeled to conform to the adjacent surface of such inner hub member, the arms being of such width as not to obstruct the spaces between the sides of the hub members and provided with integral vertical trunnions, bearings for said vertical trunnions supported on the axle, and means for adjusting the hub about said vertical trunnions.

3. In a motor vehicle, the combination with an axle, of a wheel hub consisting of two concentrically arranged members, a forked trunnion support connected with the hub and having its arms extending into the space between the hub members, above and below the inner hub member, and having their inner faces grooved or channeled to conform to the adjacent surface of such inner hub member, the arms being of such width as not to obstruct the spaces between the sides of the hub members and provided at or near their ends with integral vertical trunnions, bearings for said vertical trunnions supported on the axle, and arms extending about the inner hub member, in said spaces between the sides of the hub members, and connecting said bearings for the vertical trunnions.

4. In a motor vehicle, the combination with an axle, of a wheel hub consisting of two concentrically arranged members, a forked trunnion support having its arms extending into the space between said hub members, above and below the inner hub member, said arms being of such width as not to obstruct the spaces between the sides of the hub members and provided at or near their ends with integral vertical trunnions, a horizontal trunnion carried by said trunnion support and extending into the inner hub member, and a separable fork secured to the axle and extending into the space between the hub members, said axle fork having formed in each member an eye, entirely surrounded by the solid body of the member, to receive one of said vertical trunnions.

5. In a motor vehicle, the combination with an axle, of a wheel hub consisting of two concentrically arranged members, a forked trunnion support having its arms extending into the space between said hub members, above and below the inner hub member, said arms being of such width as not to obstruct the spaces between the sides of the hub members and provided at or near their ends with integral vertical trunnions, a horizontal trunnion carried by said trunnion support and extending into the inner hub member, a separable fork secured to the axle and extending into the space between the hub members, said axle fork having formed in each member an eye, entirely surrounded by the solid body of the member, to receive one of said vertical trunnions, and arms extending about the inner hub member in the spaces between the sides of the hub members and connecting the arms of the axle fork in the plane of the eyes therein.

6. In a motor vehicle, the combination with a stationary axle, of a wheel hub consisting of two tubular detachably connected and concentrically arranged members, a spindle extending into said hub from the inner end thereof, a support for said spindle bent on opposite sides thereof to enter the space between the aforesaid hub members and provided within said hub with two vertical trunnions arranged at diametrically opposite points, a fork secured to the axle and having eyes entirely surrounded by the solid body of the fork into which said vertical trunnions extend, and means for adjusting the hub about said vertical trunnions.

7. In a motor vehicle, the combination with a stationary axle, of a wheel hub consisting of two connected and concentrically arranged tubular members, a trunnion support extending over the inner member of the hub, a spindle arranged within the hub and secured at its inner end to said support, a fork secured to the axle and having the outer ends of its arms extending into the space between the members of the hub, two vertical trunnions carried by said trunnion support and extending into apertures in the arms of said fork, bearings interposed between the spindle and inner hub member, a supplemental ring bearing between said spindle and inner hub member, and means for adjusting the hub about said vertical trunnions.

8. In a motor vehicle, the combination of a tubular axle, a horizontally movable trunnion at the end of the axle, a steering wheel upon said trunnion, a pair of inwardly projecting ears at the base of said trunnion, a curved lever fulcrumed at one side of the axle and having its free end extending into the end of the axle, links connecting said lever with the steering wheel and a reciprocative rod for actuating said lever arranged within and extending longitudinally of the axle.

In testimony whereof I affix my signature in presence of two witnesses.

EDWARD P. COWLES.

Witnesses:
G. K. CANFIELD,
HOMER E. STEWART.